Jan. 24, 1950          L. W. MUELLER            2,495,594
                         METER STOP
Filed June 11, 1945                          2 Sheets-Sheet 1
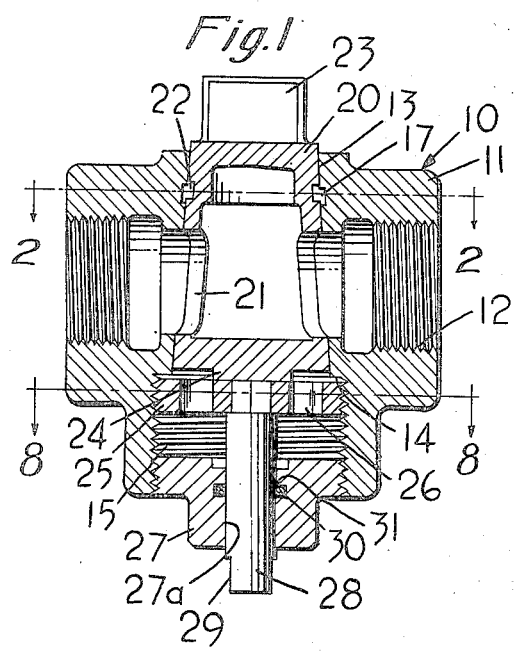
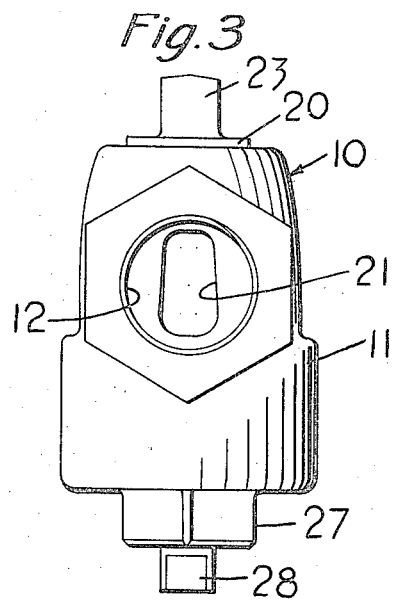
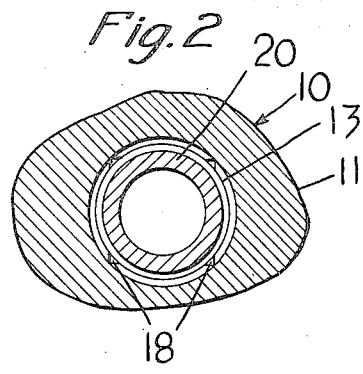
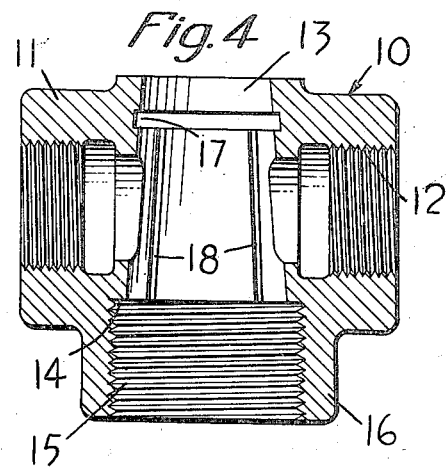
Inventor
Lucien W. Mueller Jan. 24, 1950     L. W. MUELLER     2,495,594
METER STOP
Filed June 11, 1945     2 Sheets-Sheet 2
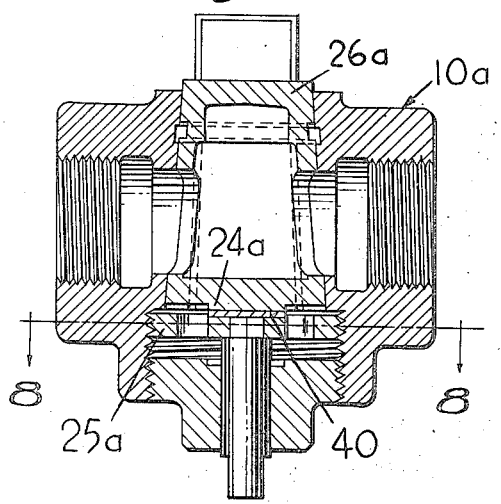
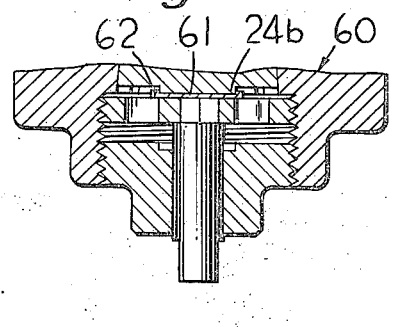
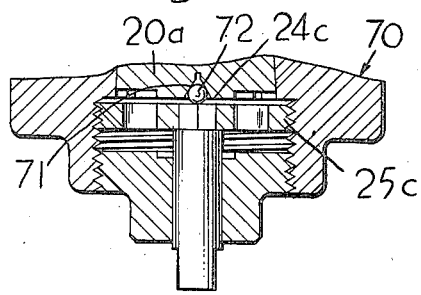
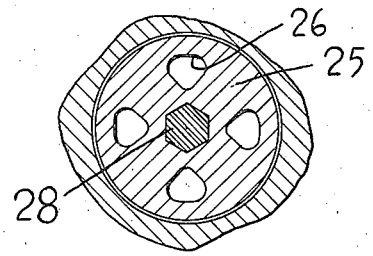
Inventor
Lucien W. Mueller
Attorneys Patented Jan. 24, 1950

2,495,594

UNITED STATES PATENT OFFICE 2,495,594

METER STOP

Lucien W. Mueller, Decatur, Ill., assignor to Mueller Co., Decatur, Ill., a corporation of Illinois Application June 11, 1945, Serial No. 598,758

6 Claims. (Cl. 251—93)

The present invention relates to meter stops.

The pipe line which connects a gas main to a residence ordinarily has a gas meter connected therein, and it is customary to also place a meter stop in this line on the inlet side of the meter. The purpose of the stop is to enable the flow of gas to the meter to be cut off, but because the flow is seldom cut off except when a change of occupancy occurs, a meter stop may not be operated for a great number of years.

Because such stops are only actuated at long intervals, the plug of the stop may become seized. For that reason, the smaller end of the plug is arranged to project from the casing so that it may be struck with a hammer to unseat it. Also, such stops are usually provided with means to lubricate the seating surface. If the plug is seized, tapping its smaller end will usually release it and if the seating surface is then supplied with lubricant, the plug readily can be rotated.

Lubricant is usually supplied to such a stop through a lubricant cap which closes a lubricant chamber at the larger end of the stop. In the prior stops, when this cap was removed for the purpose of inspection or for replenishing the lubricant, the plug could fall from the stop and be marred. Also, a temporary but serious loss of gas could occur. In other words, the prior meter stops included no means to hold the plug firmly seated so as to provide a perfect seal when the lubricant cap was removed.

An object of the present invention is to provide means in a meter stop which will secure the plug against falling from the stop when the lubricant cap is removed.

Another object of the invention is to provide means which can be used to hold the plug in sealed position at all times.

The provision of means to hold the plug seated at all times, and regardless of the lubricant pressure, is desirable because over a period of years the lubricant in the lubricant chamber may move into the flow line and gas may leak past the smaller end of the plug.

Another object of the invention is to provide a means which can normally hold the plug in tightly seated position but which is readily operable from the exterior of the stop to enable the plug to be tapped and unseated by a hammer blow.

Prior meter stops have included a spring positioned between the larger end of the plug and the lubricant cap. A spring positioned in that manner had the disadvantage of causing the plug to be even more firmly seated when the operator was threading the cap inwardly to force lubricant to the seating surfaces between the plug and casing.

A further object of the invention is to provide a means to secure the plug in the casing and which is not affected by operation of the lubricant cap.

Other objects and advantages of the invention will be apparent from the following specification and attached drawings, wherein—

Figure 1 is a central sectional view of a valve of the present invention.

Figure 2 is a transverse section on the line 2—2 of Figure 1.

Figure 3 is an elevation of the valve of Figure 1, the view being taken at right angles to Figure 1.

Figure 4 is a central vertical sectional view of the casing used in Figure 1.

Figure 5 is a central sectional view showing a modified form of meter stop.

Figure 6 is a fragmentary central sectional view showing a second modified form of valve.

Figure 7 is a fragmentary central sectional view of a third modification, and

Figure 8 is a transverse sectional view taken on the line 8—8 of Figure 1 and also on the line 8—8 of Figure 5.

Referring to Figures 1 to 4, the meter stop generally designated by the numeral 10 in these figures comprises a casing 11 provided with a flow passageway 12 and a tapered seat 13 extending transversely of the flow passageway. The smaller end of the seat 13 opens to the exterior of the casing as illustrated in Figures 1 and 4 and the larger end of the seat terminates at a shoulder 14 and is open to a lubricant chamber 15 preferably of greater diameter than the larger end of the seat 13. The wall of the lubricant chamber 15 is threaded, this wall being within an annular flange-like extension 16.

As best shown in Figure 4, the seat 13 of the casing 11 is provided with a circumferential groove 17 positioned between the ports of the flow passageway 12 and the smaller end of the seat. Four equi-distantly spaced longitudinal grooves 18 extend from the circumferential groove 17 to the shoulder 14. The longitudinal grooves 18 are so arranged that two of them are provided between each adjacent edge of the flow passageway ports.

The plug 20 provided in the valve 10 is of tapered form and includes the usual diametrically opposed ports 21. The portion of the seating surface of the plug 20 between the smaller end of the plug and the ports 21 is provided with a circumferential groove 22 normally arranged to be substantially opposite the circumferential port 17 of the casing 11. An operating shank 23 is formed on the smaller end of the plug. The larger end of the plug 20 includes a central boss 24. The plug and the central boss 24 are of such axial length that when the plug is in firmly seated position, the axial boss will project past the shoulder 14 of the lubricant chamber 15. A plug securing disc 25 threaded in the lubricant chamber 15 is adapted to have its central portion contact with the boss as indicated in Figure 1. Apertures 26 are formed in the disc 25 as shown in Figure 8, and at points spaced from the center of the disc. As a result, lubricant within the chamber 15 may move through the apertures 26 and then through the space surrounding the boss 24 to reach the lubricant grooves in the seating surfaces.

The outer end of the lubricant chamber 15 is closed by a lubricant cap 27 which is apertured at 27a to receive a stem 28 which has its inner end keyed to the disc 25 as shown in Figures 1 and 8. Stem 28 is also suitably held against moving out of the disc 25. The outer end 29 of stem 28 is squared or otherwise arranged to be engaged by a wrench so that the position of the disc 25 may be varied without removal of the lubricant cap 27.

An annular endless sealing element 30 is preferably positioned in an annular groove 31 of lubricant cap 27 and which groove is square in radial section. The ring engages the surface of the stem 28 and the diametrically opposite wall of groove 31 to provide a seal. Annular sealing element 31 is formed of bodily resilient material and is preferably normally circular in radial section. Therefore, any grease or pressure moving from the lubricant chamber 15 and along the stem 28 will act upon the portion of the ring 31 shown uppermost in Figure 1 to compress the ring to substantially elliptical form in radial section so that the inner and outer surfaces of the ring will respectively more tightly engage the stem 28 and the diametrically opposed wall of the groove 31.

In the use of the valve 10 disclosed in Figures 1 to 4 and 8, when the stop is to be used in a line, the lubricant chamber 15 will be filled with lubricant while the plug is held seated by having holding disc 25 threaded firmly in against the larger end of the plug. The cap 27 will then be applied over the stem 28 and threaded in chamber 15 to exert pressure upon the lubricant to force it into the seating surface. The pressure of the lubricant acting on the larger end of the plug will also urge the plug to a seated position. The ring 30 naturally will not fall from the groove 31 when the cap is removed from stem 28 because the aperture 27a is of less diameter than the ring.

The stem 28 can be rotated inwardly to firmly contact with the plug in the event that the pressure of grease has moved the plug closer to the seat 13.

As has been hereinbefore indicated, the meter stop may not be operated again for a number of years. If, at this time, the plug is found to be seized, the operator can back off the disc 25 to a slight extent and then tap the shank 23 of the plug with a hammer to unseat it. The plug can immediately be reseated either by rotating the lubricant cap 27 further inwardly to increase the pressure on the lubricant or by rotating the shank 28 inwardly so that the plug will be forced to its seat either by lubricant pressure or by mechanical force. However, after a plug has been in use for some years, the lubricant supply in the chamber 15 becomes depleted by movement into the flow line. The holding disc 25 and its shank 28 thereby provide a convenient means to return the plug to its seat after tapping and without recourse to the lubricant cap 27. After the plug has been unseated, rotated to the desired position, and again secured in seated position by the operation of the holding disc 25, the supply of lubricant can be renewed without danger of the plug falling from its seat.

The valve 10a illustrated in Figure 5 is identical with that disclosed in Figures 1 to 4 except that a flat anti-friction element 40 is secured to the central boss 24a of the plug 20a illustrated in Figure 5. The anti-friction element 40 enables the plug to be readily rotated with respect to the holding disc 25a and without the necessity of slightly backing off the disc. However, the disc must be backed off to permit the plug to be unseated by tapping.

The valve 60 disclosed in Figure 6 is identical with the valve 10 of Figures 1 to 4 except that a flat anti-friction element including an inwardly extending flange 62 is secured to and surrounds the boss 24b at the larger end of the plug.

The valve generally designated by the numeral 70 in Figure 7 is identical with the forms previously described except that the central boss 24c of the plug 20c has a socket 71 drilled therein and a hardened steel ball 72 is positioned in this socket to bear upon the holding disc 25c. The provision of the ball anti-friction bearing at this point enables the plug 20c to be rotated without difficulty insofar as the holding disc 25c is concerned. It will be observed that by providing a ball at this point, none of the opposed surfaces of the plug and the disc need be machined except for a very simple center drilling operation which forms the socket 71.

The valves illustrated in Figures 5 to 7 are not illustrated as being provided with sealing rings surrounding their plug securing disc operating stems. However, it will be understood that such a seal may be provided in any of these forms of valves and in the same manner as is disclosed in Figures 1 to 4.

It will be noted that all of the securing means disclosed herein can be relied upon to hold a plug seated for an indefinite period and regardless of whether the grease supply becomes exhausted because of escape to the flow line.

The terminology used in the specification is for the purpose of description and not of limitation, the scope of the invention being indicated in the claims.

I claim:

1. In a valve, a casing including a flow passageway and a tapered seat extending transversely of the flow passageway, a tapered plug including a flow port positioned in said seat, a threaded bore extending axially from the larger end of the casing seat to the adjacent exterior of the casing and providing a lubricant chamber, lubricant grooves in the seating surface communicating with the lubricant chamber, a cap threaded in the outer end of the threaded bore and adapted to be operated to place the lubricant under pressure, plug securing means threaded in the inner portion of the bore and engaging the larger end of the plug, and operating means for the plug securing means extending through said cap to the exterior of the valve.

2. A valve of the character defined in claim 1 wherein the plug securing means comprises an apertured disc element.

3. A valve of the character defined in claim 1 wherein a flat anti-friction element is interposed between the plug and said plug securing means.

4. A valve of the character defined in claim 1 wherein an anti-friction ball is interposed between the plug and said plug securing means.

5. A valve of the character defined in claim 1 wherein the plug includes a central boss at its larger end, which boss is socketed to receive an anti-friction ball and the anti-friction ball bears upon said plug securing means.

6. In a valve, a casing including a flow passageway and a tapered seat extending transversely of the flow passageway, a tapered plug including a flow port positioned in said seat, a threaded bore extending axially from the larger end of the casing seat to the adjacent exterior of the casing and providing a lubricant chamber, lubricant grooves in the seating surface communicating with the lubricant chamber, a cap threaded in the outer end of the threaded bore and adapted to be operated to place the lubricant under pressure, plug securing means threaded in the inner portion of the bore and engaging the larger end of the plug, an operating stem for said plug securing means extending through an aperture in said cap, and an annular sealing ring normally circular in radial section positioned within the cap aperture and engaging said stem.

LUCIEN W. MUELLER.

REFERENCES CITED

The following references are of record in the file of this patent:

UNITED STATES PATENTS

| Number | Name | Date |
|---|---|---|
| 294,935 | Taylor | Mar. 11, 1884 |
| 760,546 | Moreland | May 4, 1904 |
| 1,365,116 | Martin | Jan. 11, 1921 |
| 2,286,689 | Scherer | June 16, 1942 |